(12) United States Patent
Lin et al.

(10) Patent No.: US 8,120,838 B2
(45) Date of Patent: Feb. 21, 2012

(54) ELECTROPHORETIC DISPLAY DEVICE

(75) Inventors: Hsiang-Lin Lin, Hsinchu (TW);
Wei-Ming Huang, Hsinchu (TW);
Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 150 days.

(21) Appl. No.: 12/783,170

(22) Filed: May 19, 2010

(65) Prior Publication Data

US 2011/0286076 A1    Nov. 24, 2011

(51) Int. Cl.
*G02B 26/00* (2006.01)
*G09G 3/34* (2006.01)

(52) U.S. Cl. ........................... 359/296; 345/107

(58) Field of Classification Search .................. 359/296; 345/107; 430/32; 204/600
See application file for complete search history.

(56) References Cited

U.S. PATENT DOCUMENTS

| | | | |
|---|---|---|---|
| 7,061,662 B2 | 6/2006 | Chung et al. | |
| 7,271,947 B2 | 9/2007 | Liang et al. | |
| 2003/0192213 A1 | 10/2003 | O'Connell | |
| 2003/0231162 A1 | 12/2003 | Kishi | |
| 2005/0285843 A1 | 12/2005 | Yoshinaga et al. | |
| 2006/0125779 A1 | 6/2006 | Liang et al. | |
| 2008/0024425 A1* | 1/2008 | Shido | 345/107 |
| 2008/0048099 A1 | 2/2008 | Nagai et al. | |
| 2008/0238868 A1 | 10/2008 | Johnson et al. | |
| 2009/0103161 A1 | 4/2009 | Kothari et al. | |
| 2009/0174928 A1 | 7/2009 | Kim et al. | |

FOREIGN PATENT DOCUMENTS

| | | |
|---|---|---|
| CN | 101614927 A | 12/2009 |
| JP | 2005321737 A | 11/2005 |
| WO | 2007024898 A2 | 3/2007 |

* cited by examiner

*Primary Examiner* — William Choi
(74) *Attorney, Agent, or Firm* — Morris Manning & Martin LLP; Tim Tingkang Xia, Esq.

(57) ABSTRACT

The present invention in one aspect relates to a solar cell formed on a substrate, a bottom electrode member formed on the solar cell, an electrophoretic display panel formed on the bottom electrode member, having a plurality of electrophoretic cell structures spatially arranged in a matrix form, each electrophoretic cell structure containing a plurality of charged particles movable in the electrophoretic cell structure responsively to applied fields, and a top electrode member formed on the electrophoretic display panel, where at least one of the bottom electrode member and the top electrode member includes a plurality of in-plane switching (IPS) electrodes. Each IPS electrode is positioned in relation to a corresponding electrophoretic cell structure for controlling movements of the charged particles therein along a horizontal direction parallel to the electrophoretic display panel.

44 Claims, 9 Drawing Sheets

ELECTROPHORETIC DISPLAY DEVICE

FIELD OF THE INVENTION

The present invention relates generally to an electrophoretic display (EPD), and more particularly, to a shutter mode solar EPD device that utilizes a plurality of in-plane switching (IPS) electrode to selectively control horizontal movements of charged particles contained in its electrophoretic cell structures so as to improve the efficiency of the solar cell therein.

BACKGROUND OF THE INVENTION

An electrophoretic display (EPD) forms visible images by rearranging charged pigment particles using an applied electric field. The EPD is formed by combining a large number of "micro-cup" or "micro-capsule" EPD cell structures into a flat panel. Each of "micro-cup" or "micro-capsule" EPD cell structures contains charged particles dispersed in hydrocarbon oil. The charged particles can be titanium dioxide (TiOx) particle approximately one micrometer in diameter. A dark-colored dye is also added to the oil, along with surfactants and charging agents that cause the particles to take on an electric charge. This mixture is placed between two parallel, conductive plates. When a voltage is applied across the two plates, the particles will migrate electrophoretically to the plate bearing the opposite charge from that on the particles. When the particles are located at the top side of the display, it appears white, because light is scattered back to the viewer by the high-index titanium dioxide particles. When the particles are located at the bottom side of the display, it appears dark, because the incident light is absorbed by the colored dye. If the rear electrode is divided into a number of small picture elements (pixels), then an image can be formed by applying the appropriate voltage to each region of the display to create a pattern of reflecting and absorbing regions.

The EPD device is widely used as electronic paper, for example, for electronic book or electronic newspaper publication. The EPD device has the advantages of very low power consumption. Generally, when the displayed image is not changed it consumes no electricity, while when the displayed image changes it only consumes very limited amount of electricity. An EPD can be self-sufficient if combined with a solar cell component to supply electricity.

Refer to FIG. 9 of a related art, when an EPD and a solar cell are combined, the display area and solar cell are usually in separate areas, which takes additional space from the display area. Thus the solar cell area can not be made very large. If the solar cell is embedded within the display area, the charged particles may block the passage of light to the solar cell due to the nature of the EPD, thereby limiting the efficiency of the solar cell.

Therefore, a heretofore unaddressed need exists in the art to address the aforementioned deficiencies and inadequacies.

SUMMARY OF THE INVENTION

The present invention, in one aspect, relates to an EPD device. In one embodiment, the EPD device includes a substrate having a top surface and an opposite, bottom surface, a solar cell formed on the top surface of the substrate, and an electrophoretic display panel having a plurality of electrophoretic cell structures spatially arranged in a matrix form, where each electrophoretic cell structure defines a middle area and a side area surrounding the middle area, and contains a plurality of charged particles movable in the electrophoretic cell structure responsively to applied fields. The plurality of charged particles includes single-color charged particles with a single polarity or multi-color charged particles with one or more polarities. In one embodiment, each electrophoretic cell structure further contains an electrophoretic medium, where the electrophoretic medium includes a colored electrophoretic medium or a colorless electrophoretic medium. In one embodiment, each electrophoretic cell structure is formed of an electrophoretic micro-cup structure or an electrophoretic micro-capsule structure.

In one embodiment, the solar cell includes a top electrode, a bottom electrode formed on the substrate and a photovoltaic converting layer formed between the top electrode and the bottom electrode, where the top electrode of the solar cell is transparent.

The EPD device also includes a top electrode member formed on the electrophoretic display panel, and a bottom electrode member formed between the solar cell and the electrophoretic display panel, having a plurality of bottom electrodes and in-plane switching (IPS) electrodes, where each IPS electrode is positioned in relation to a corresponding electrophoretic cell structure for controlling movements of the charged particles therein along a horizontal direction parallel to the electrophoretic display panel, and each bottom electrode is formed in relation to the IPS electrode and the corresponding electrophoretic cell structure for controlling movements of the charged particles therein along a vertical direction perpendicular to the electrophoretic display panel. In one embodiment, each IPS electrode has two or more branches, and each bottom electrode has at least one branch, and the at least one branch of each bottom electrode and the two or more branches of its corresponding IPS electrode are alternately positioned so that each bottom electrode and its corresponding IPS electrode are complementary to each other.

In one embodiment, the bottom electrode member includes an active matrix electrode member comprising a plurality of thin-film transistors (TFTs), where each TFT is electrically coupled to one of the plurality of bottom electrodes and IPS electrodes. In another embodiment, the bottom electrode member includes a passive matrix electrode member.

In one embodiment, the top electrode member includes a single electrode. In another embodiment, the top electrode member includes a plurality of top electrodes and IPS electrodes, each top electrode and each IPS electrode positioned in relation to a corresponding bottom electrode and a corresponding IPS electrode, respectively, of the bottom electrode member.

The top electrode member and the bottom electrode member are transparent to light.

In one embodiment, the EPD device may further have an interface layer formed between the electrophoretic display panel and the plurality of bottom electrodes and IPS electrodes of the bottom electrode member, where the interface layer includes an insulative layer or an adhesive layer. The EPD device may also have a touch function film, a color filter and/or a barrier film layer formed on the top electrodes.

In another aspect, the present invention relates to an EPD device. In one embodiment, the EPD device includes a substrate having a top surface and an opposite, bottom surface, a solar cell formed on the top surface of the substrate, a bottom electrode member formed on the solar cell, an electrophoretic display panel formed on the bottom electrode member, and a top electrode member formed on the electrophoretic display panel.

The electrophoretic display panel includes a plurality of electrophoretic cell structures spatially arranged in a matrix form, where each electrophoretic cell structure defines a middle area and a side area surrounding the middle area, and contains a plurality of charged particles movable in the electrophoretic cell structure responsively to applied fields. In one embodiment, each electrophoretic cell structure further contains an electrophoretic medium, where the electrophoretic medium includes a colored electrophoretic medium or a colorless electrophoretic medium. The plurality of charged particles includes single-color charged particles with a single polarity or multi-color charged particles with one or more polarities. In one embodiment, each electrophoretic cell structure is formed of an electrophoretic micro-cup structure or an electrophoretic micro-capsule structure.

The top electrode member includes a plurality of top electrodes and IPS electrodes, where each IPS electrode is positioned in relation to the side area of a corresponding electrophoretic cell structure for controlling movements of the charged particles therein along a horizontal direction parallel to the electrophoretic display panel, and each bottom electrode is formed in relation to the IPS electrode and the corresponding electrophoretic cell structure for controlling movements of the charged particles therein along a vertical direction perpendicular to the electrophoretic display panel. In one embodiment, each IPS electrode has two or more branches, and each bottom electrode has at least one branch, and the at least one branch of each bottom electrode and the two or more branches of its corresponding IPS electrode are alternately positioned so that each bottom electrode and its corresponding IPS electrode are complementary to each other. In one embodiment, the top electrode member includes an active matrix electrode member comprising a plurality of TFTs, where each TFT is electrically coupled to one of the plurality of bottom electrodes and IPS electrodes. In another embodiment, the top electrode member includes a passive matrix electrode member.

In one embodiment, the top electrode member and the bottom electrode member are transparent to light.

In yet another aspect, the present invention relates to an EPD device. In one embodiment, the EPD device includes a solar cell formed on a substrate, a bottom electrode member formed on the solar cell, an electrophoretic display panel formed on the bottom electrode member, having a plurality of electrophoretic cell structures spatially arranged in a matrix form, where each electrophoretic cell structure defines a middle area and a side area surrounding the middle area, and contains a plurality of charged particles movable in the electrophoretic cell structure responsively to applied fields, and a top electrode member formed on the electrophoretic display panel, where at least one of the bottom electrode member and the top electrode member includes a plurality of IPS electrodes, where each IPS electrode is positioned in relation to the side area of a corresponding electrophoretic cell structure for controlling movements of the charged particles therein along a horizontal direction parallel to the electrophoretic display panel.

In one embodiment, the at least one of the bottom electrode member and the top electrode member further includes a plurality of electrodes, where each electrode is formed in relation to the IPS electrode and a corresponding electrophoretic cell structure for controlling movements of the charged particles therein along a vertical direction perpendicular to the electrophoretic display panel.

In one embodiment, each IPS electrode has two or more branches, and each bottom electrode has at least one branch, and the at least one branch of each bottom electrode and the two or more branches of its corresponding IPS electrode are alternately positioned so that each bottom electrode and its corresponding IPS electrode are complementary to each other.

In one embodiment, the at least one of the bottom electrode member and the top electrode member includes an active matrix electrode member comprising a plurality of TFTs, each TFT electrically coupled to one of the plurality of bottom electrodes and IPS electrodes. In another embodiment, the at least one of the bottom electrode member and the top electrode member includes a passive matrix electrode member.

The plurality of charged particles includes single-color charged particles with a single polarity or multi-color charged particles with one or more polarities. In one embodiment, each electrophoretic cell structure further contains an electrophoretic medium, where the electrophoretic medium includes a colored electrophoretic medium or a colorless electrophoretic medium. Each electrophoretic cell structure is formed of an electrophoretic micro-cup structure or an electrophoretic micro-capsule structure.

In a further aspect, the present invention relates to an EPD device. In one embodiment, the EPD device includes a bottom electrode member comprising a bottom electrode layer having a plurality of bottom electrodes and IPS electrodes and a switching member having a plurality of TFTs, where each TFT is electrically coupled to one of the plurality of bottom electrodes and IPS electrodes; a solar cell formed between the bottom electrode layer and the switching member of the bottom electrode member; an electrophoretic display panel formed on the bottom electrode layer of the bottom electrode member, having a plurality of electrophoretic cell structures spatially arranged in a matrix form, where each electrophoretic cell structure defines a middle area and a side area surrounding the middle area, and contains a plurality of charged particles movable in the electrophoretic cell structure responsively to applied fields; and a top electrode member formed on the electrophoretic display panel.

Each electrophoretic cell structure may further contain an electrophoretic medium, where the electrophoretic medium includes a colored electrophoretic medium or a colorless electrophoretic medium. In one embodiment, the plurality of charged particles includes single-color charged particles with a single polarity or multi-color charged particles with one or more polarities. In one embodiment, each electrophoretic cell structure is formed of an electrophoretic micro-cup structure or an electrophoretic micro-capsule structure.

The bottom electrode member is formed such that each IPS electrode is positioned in relation to a corresponding electrophoretic cell structure for controlling movements of the charged particles therein along a horizontal direction parallel to the electrophoretic display panel, while each bottom electrode is formed in relation to the IPS electrode and the corresponding electrophoretic cell structure for controlling movements of the charged particles therein along a vertical direction perpendicular to the electrophoretic display panel.

In one embodiment, each IPS electrode has two or more branches, and each bottom electrode has at least one branch, and the at least one branch of each bottom electrode and the two or more branches of its corresponding IPS electrode are alternately positioned so that each bottom electrode and its corresponding IPS electrode are complementary to each other.

In one embodiment, the top electrode member includes a single electrode. In another embodiment, the top electrode member includes a plurality of top electrodes and IPS electrodes, each top electrode and each IPS electrode positioned in relation to a corresponding bottom electrode and a corresponding IPS electrode, respectively, of the bottom electrode member.

Both the top electrode member and the bottom electrode member are transparent to light.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
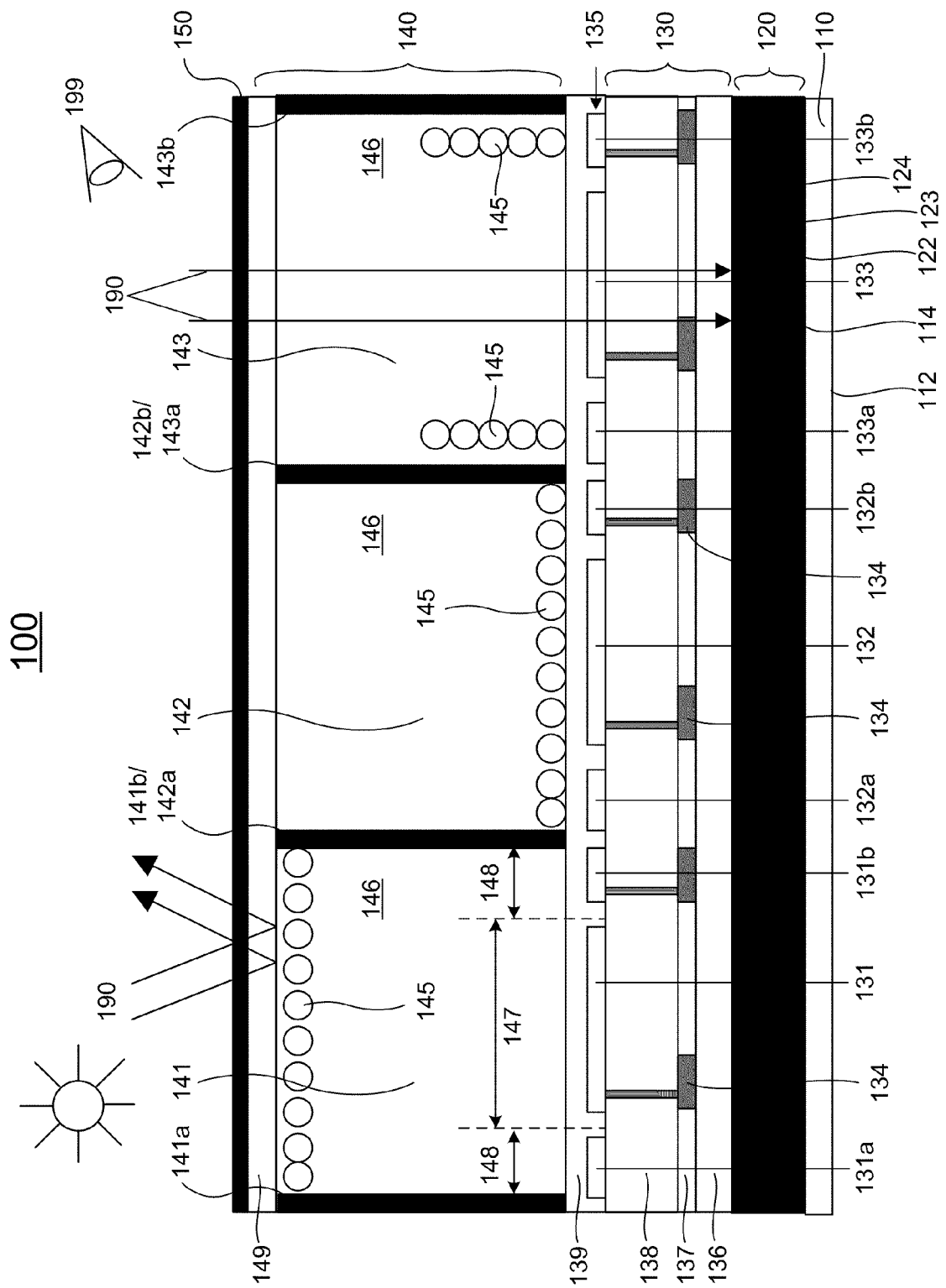
FIG. 1 shows schematically a cross-sectional view of an EPD device in one state according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention relates to a shutter mode solar EPD device that utilizes a plurality of IPS electrode to selectively control horizontal movements of charged particles contained in its electrophoretic cell structures so as to improve the efficiency of the solar cell therein.

Figure 2:
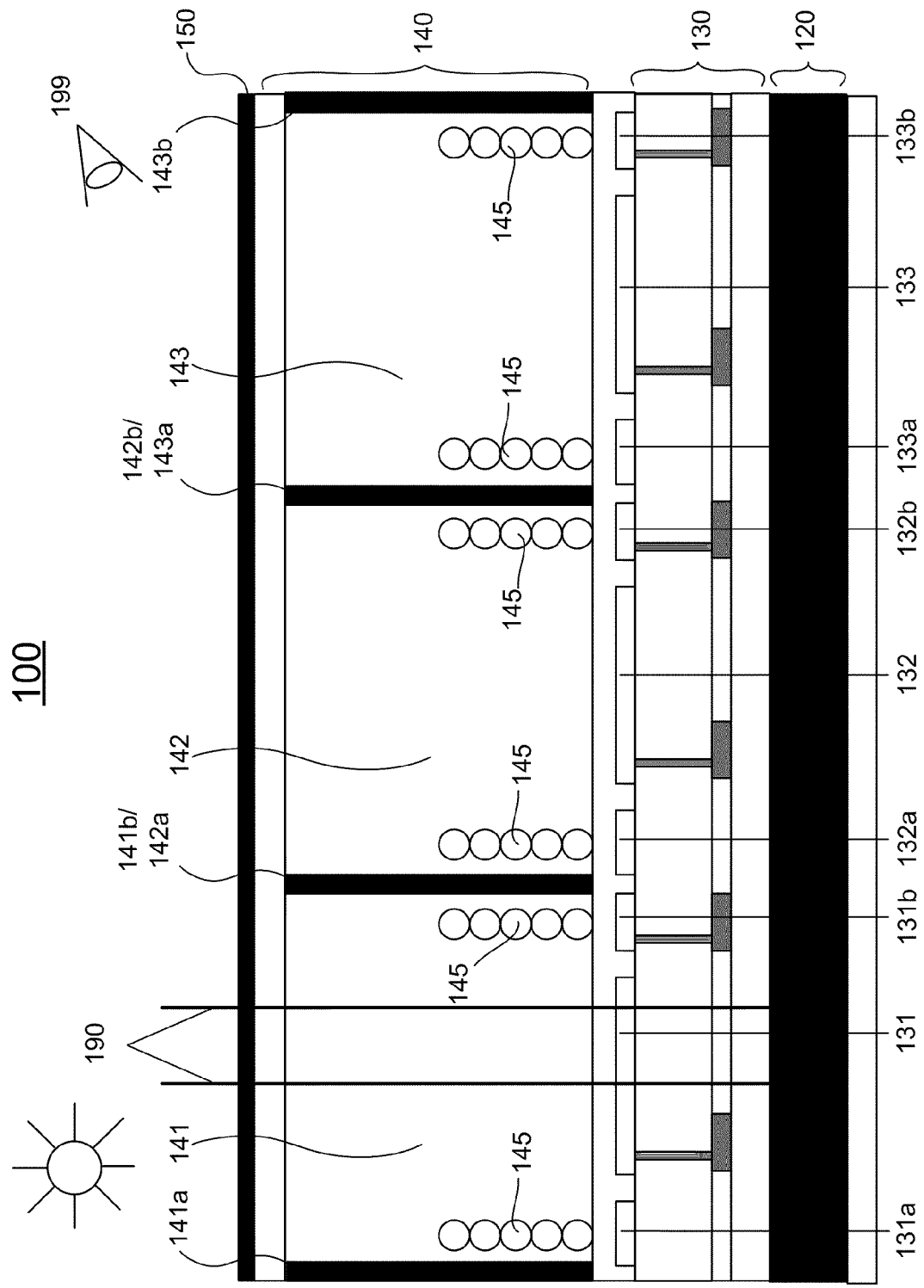
FIG. 2 shows schematically a cross-sectional view of the EPD device of FIG. 1 in another state.

Referring now to FIGS. 1 and 2, a partially cross-sectional view of an EPD device 100 with a shutter mode solar cell is shown according to one embodiment of the present invention.

In this exemplary embodiment, the EPD device 100 has a substrate 110 having a top surface 114 and an opposite, bottom surface 112, a solar cell 120 formed on the top surface 114 of the substrate 110, a bottom electrode member 130 formed on the solar cell 120, an interface layer 139 formed on the bottom electrode member 130, an electrophoretic display panel 140 formed on the interface layer 139, and a top electrode member 150 formed on the electrophoretic display panel 140.

The electrophoretic display panel 140 has a plurality of electrophoretic cell structures spatially arranged in a matrix form. Without limiting the scope of the invention, only three electrophoretic cell structures 141, 142 and 143 are illustrated in FIG. 1. In the exemplary embodiment, each electrophoretic cell structure 141, 142 or 143 is formed in an electrophoretic micro-cup structure defined by cell walls 141a and 141b, 142a and 142b or 143a and 143b, and defines a middle area 147 and a side area 148 surrounding the middle area 147. In other words, the side area 148 of each electrophoretic micro-cup structure 141, 142 or 143 is proximate to the cell walls 141a and 141b, 142a and 142b or 143a and 143b. As shown below, each electrophoretic cell structure can also be formed in other structures such as an electrophoretic micro-capsule structure.

Each electrophoretic micro-cup structure 141, 142 or 143 contains an electrophoretic medium 146 and a plurality of charged particles 145 dispersed in the electrophoretic medium 146 and being movable in the electrophoretic micro-cup structure 141, 142 or 143 responsively to applied fields. The electrophoretic medium 146 can be a colored electrophoretic medium such as a colored dielectric solvent, or a colorless electrophoretic medium. The plurality of charged particles 145 can be single-color charged particles with a single polarity or multi-color charged particles with one or more polarities. For the purpose of illustration of the present invention, each electrophoretic micro-cup structure 141, 142 or 143 is filled with a single-colored electrophoretic medium 146, and contains single-colored (white) particles 145 with positive charges. In one embodiment, each electrophoretic micro-cup structure 141, 142 or 143 can be filled with hydrocarbon oil. A dark-colored dye can be added to the oil, along with surfactants and charging agents that cause the particles to take on an electric charge. Titanium dioxide particles can be used as the electrically charged particles. They are approximately one micrometer in diameter, and are dispersed in hydrocarbon oil.

It is understood that different electrophoretic micro-cup structures filled with different colored electrophoretic medium and the like are also within the scope of the present invention.

Figure 6:
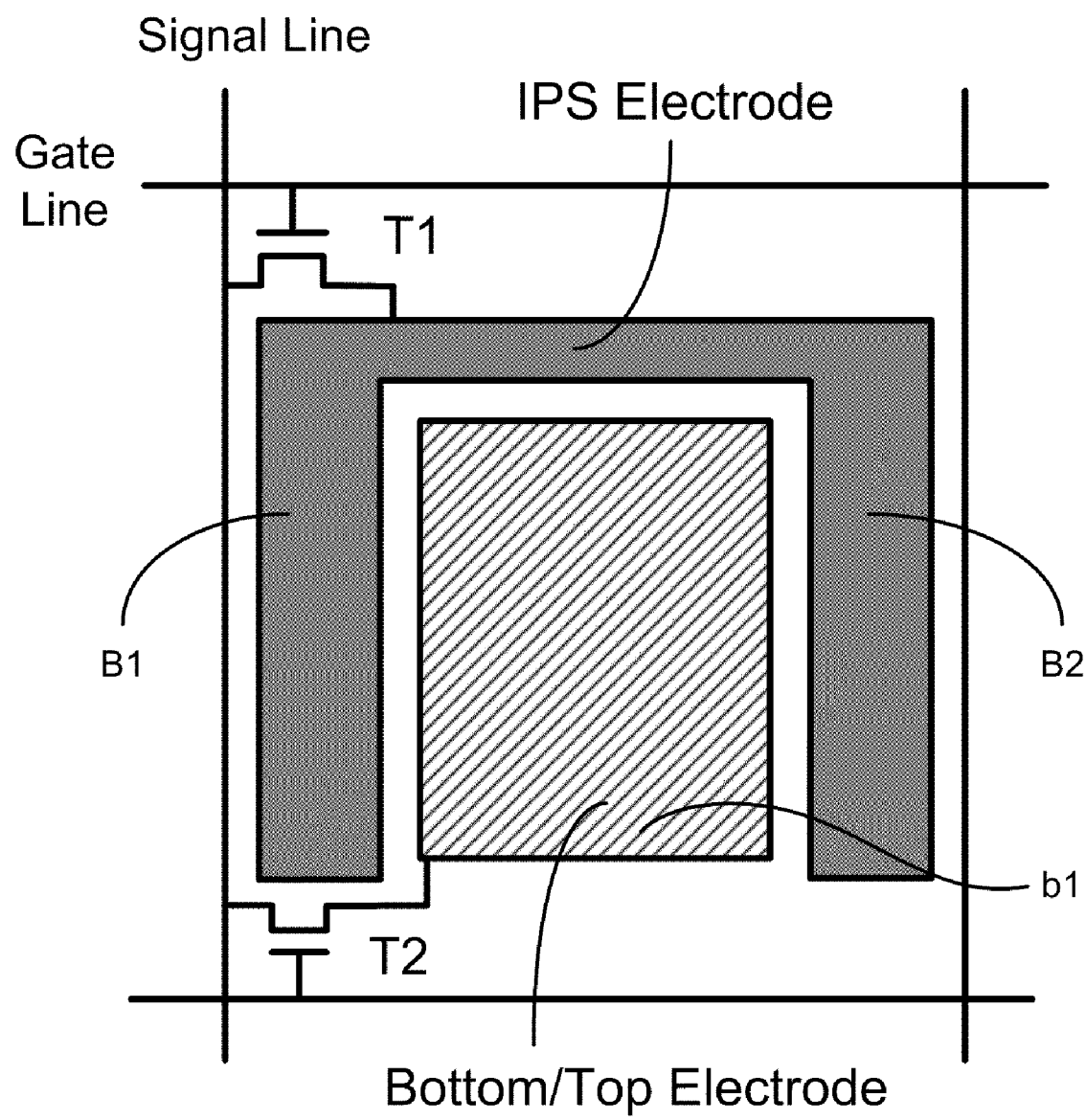
FIG. 6 shows schematically an electrode layout of an EPD device according to one embodiment of the present invention.
Figure 7:
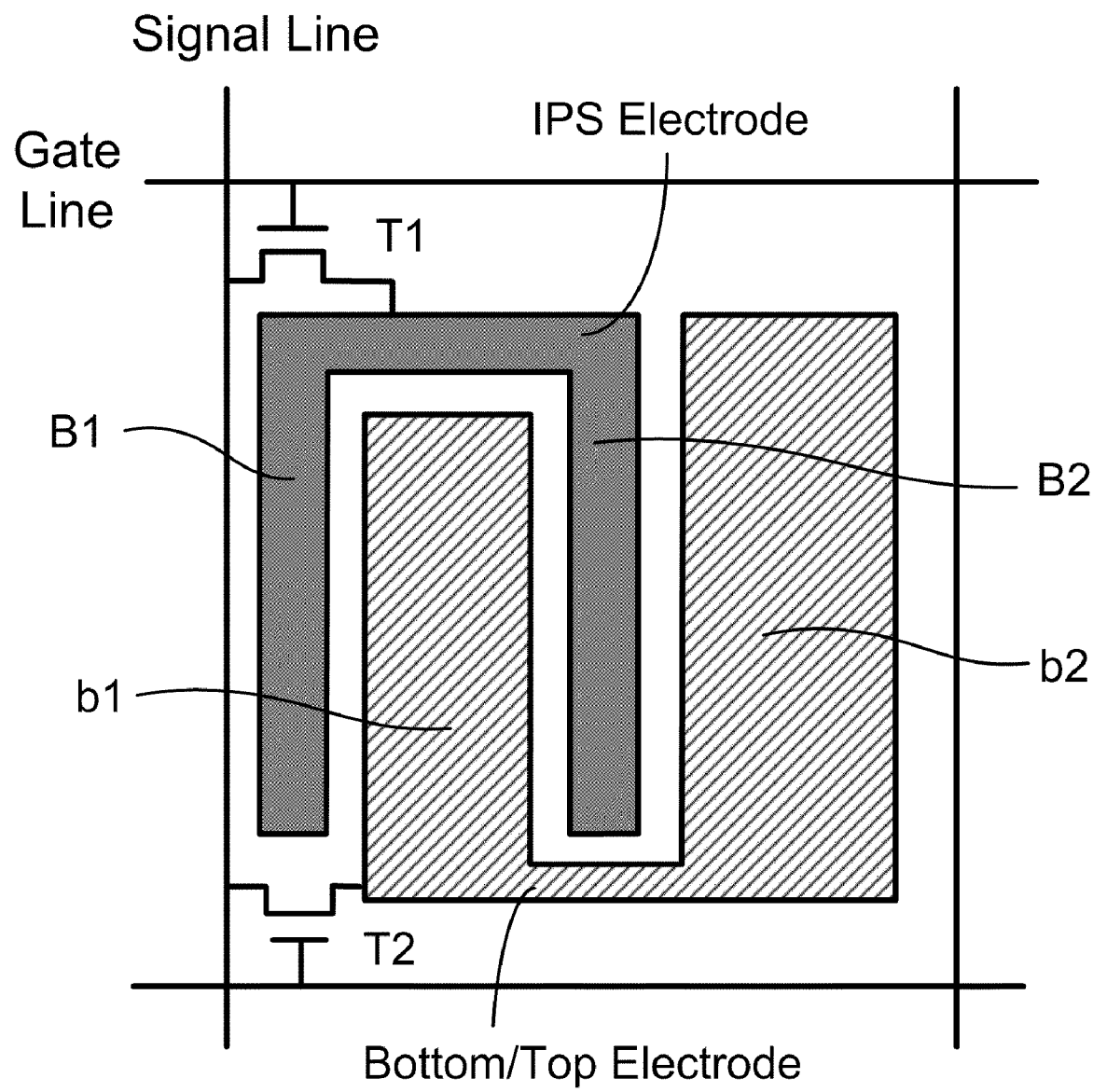
FIG. 7 shows schematically an electrode layout of an EPD device according to another embodiment of the present invention.
Figure 8:
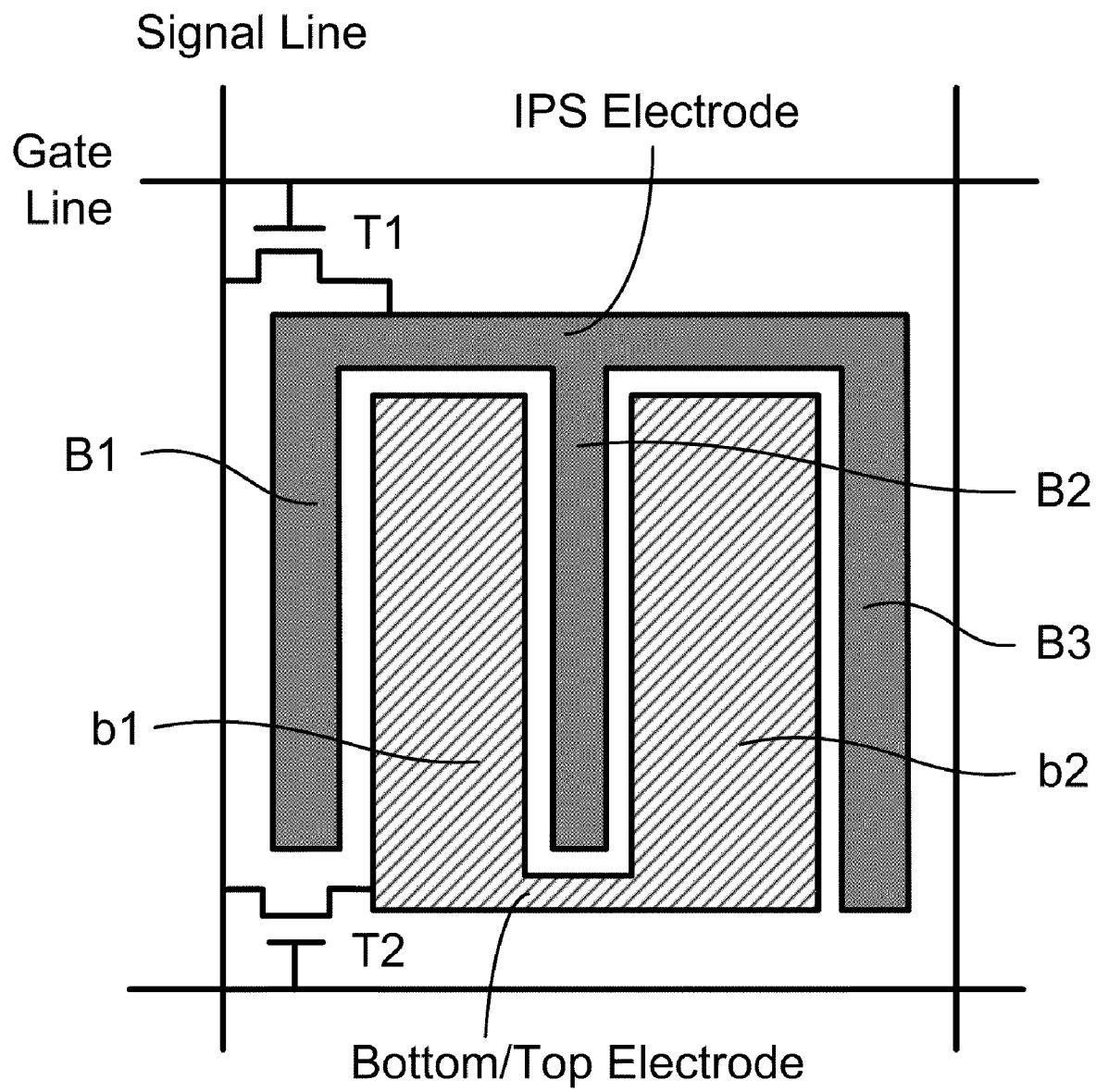
FIG. 8 shows schematically an electrode layout of an EPD device according to yet another embodiment of the present invention.
Figure 9:
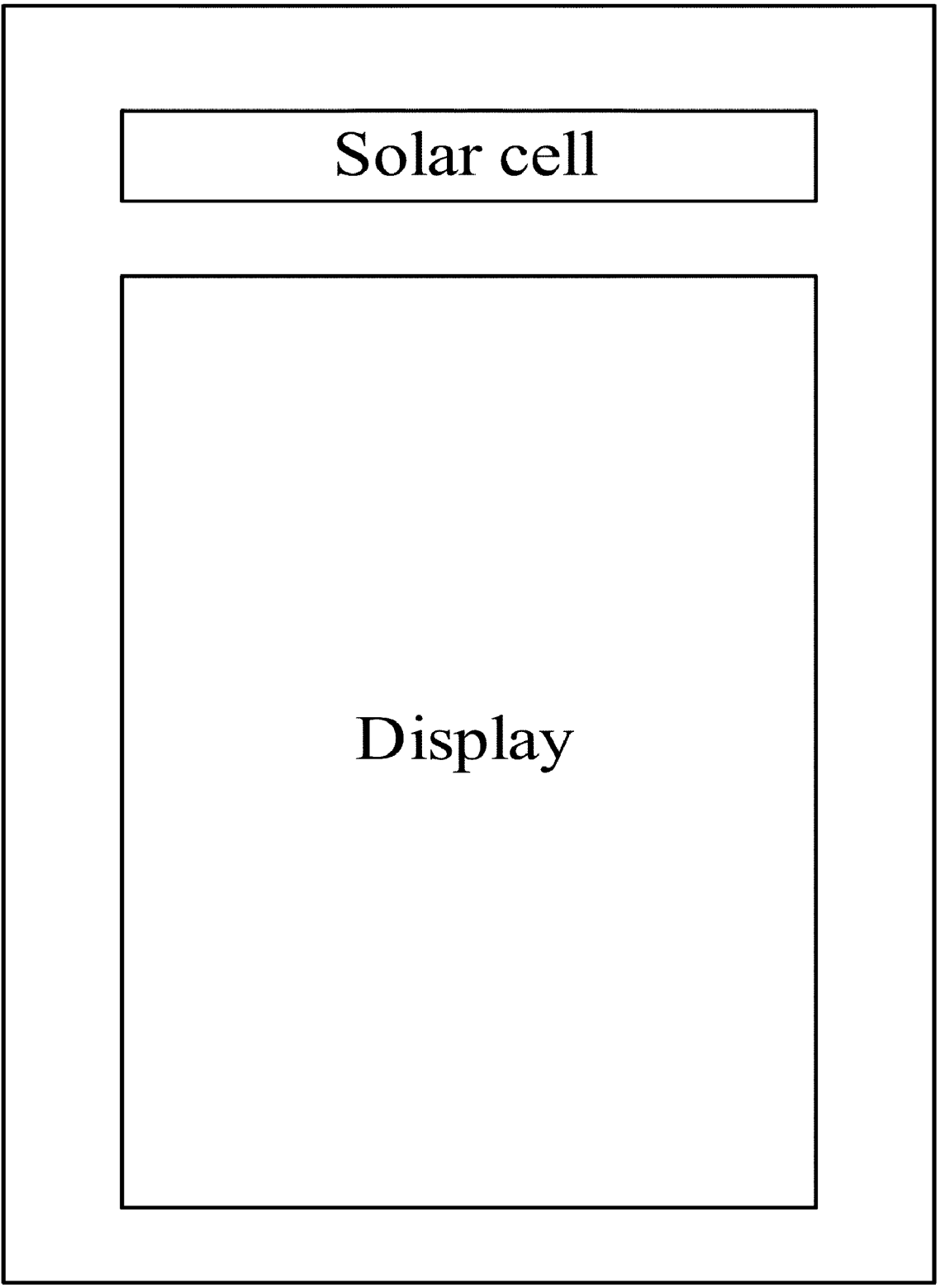
FIG. 9 shows a conventional EPD device.

The bottom electrode member 130 is formed between the solar cell 120 and the interface layer 139, and includes a plurality of bottom electrodes and in-plane switching (IPS) electrodes. Each IPS electrode has two or more branches, and each bottom electrode has at least one branch. The at least one branch of each bottom electrode and the two or more branches of its corresponding IPS electrode are alternately positioned so that each bottom electrode and its corresponding IPS electrode are complementary to each other, as shown in FIGS. 6-8. Without limiting the scope of the invention, only three bottom electrodes 131, 132 and 133 and three branch pair of the IPS electrodes 131a and 131b, 132a and 132b, and 133a and 133b are illustrated in FIG. 1. Each branch pair of the IPS electrodes, for example, the IPS electrode branch pair 131a and 131b, is positioned in relation to the side area 148 of a corresponding electrophoretic micro-cup structure 141 and each bottom electrode, for example, the bottom electrode 131, is formed between the IPS electrode pair 131a and 131b and in relation to the middle area 147 of the corresponding electrophoretic micro-cup structure 141.

The bottom electrode member 130 can be formed in an active matrix type or in a passive type. In this embodiment of FIG. 1, an active matrix type of the bottom electrode member 130 is shown. Specifically, the bottom electrode member 130 is formed with multiple layers 136, 137 and 138, and has a bottom electrode layer having the plurality of bottom electrodes 131, 132 and 133 and IPS electrodes 131a, 131b, 132a, 132b, 133a and 133b formed on the layer 138, and a plurality of switching devices such as thin-film transistors (TFTs) 134 formed in the layers 137 and 138. Each TFT 134 is electrically coupled to a bottom electrode or an IPS electrode pair.

Figure 3:
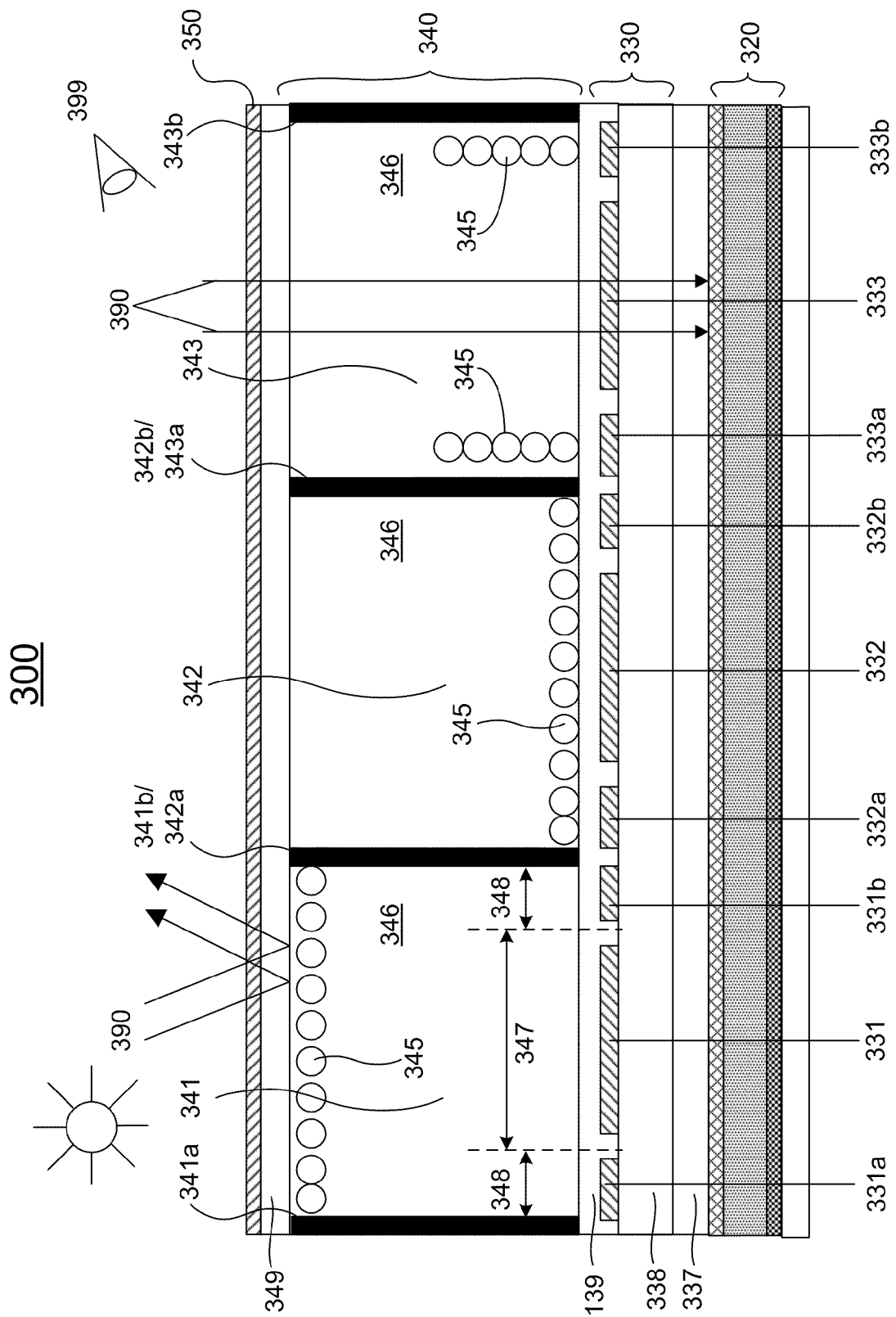
FIG. 3 shows schematically a cross-sectional view of an EPD device according to another embodiment of the present invention.

The top electrode member 150 includes a single electrode 150. As shown in FIG. 3 below, the top electrode member can also includes a plurality of top electrodes and IPS electrodes, where each top electrode and each IPS electrode positioned in relation to a corresponding bottom electrode and a corresponding IPS electrode, respectively, of the bottom electrode member.

The top electrode member 150 and the bottom electrode member 130 are transparent to light.

The solar cell 120 has a top electrode 124, a bottom electrode 122 formed on the top surface 114 of the substrate 110, and an photovoltaic converting layer 123 formed between the top electrode 124 and the bottom electrode 122. The photovoltaic converting layer 123 is adapted for converting photon energy of a light beam 190 passing through one or more electrophoretic micro-cup structures 141, 142 and 143 into electrical energy. The top electrode 124 is transparent so that the light beam 190 can pass through it and be incident to the photovoltaic converting layer 123.

Additionally, a seal layer 149 may be formed between the electrophoretic display panel 140 and the top electrode member 150 for sealing the electrophoretic micro-cup structure 141, 142 and 143. The interface layer 139 may includes an insulative layer or an adhesive layer.

Further, a touch function film, a color filter and/or a barrier film layer (not shown) may be formed on the top electrode 150.

For such an EPD device 100, the vertical movements of the charged particles 145 in each electrophoretic micro-cup structure 141, 142 or 143 are controlled a voltage difference between the top electrode 150 and a corresponding bottom electrode 131, 132, or 133, while the horizontal movements of the charged particles 145 in each electrophoretic micro-cup structure 141, 142, or 143 are controlled a voltage difference between the bottom electrode 131, 132, or 133 and the corresponding pair of the IPS electrodes 131a and 131b, 132a and 132b, or 133a and 133b.

For example, if the particles 145 is white and carry positive charges, and the top electrode 150 is applied with a negative voltage (polarity), while the bottom electrode 131 is applied with a positive voltage (polarity), the white particles 145 migrate vertically to the top surface of the electrophoretic micro-cup structure 141. Accordingly, a viewer 199 sees the color of the pixel associated with the micro-cup structure 141 in the white color because the light beam 190 is scattered back to the viewer 199 by the particles 145.

For the same type of the particles 145, if the top electrode 150 is applied with a positive voltage (polarity), while the bottom electrode 132 is applied with a negative voltage (polarity), the white particles 145 migrate vertically to the bottom surface of the electrophoretic micro-cup structure 142. Accordingly, a viewer 199 sees the color of the pixel associated with the micro-cup structure 141 in the color of the electrophoretic medium 146 (colored or transparent).

For the same type of the particles 145, if both the top electrode 150 and the bottom electrode 133 are applied with a positive voltage (polarity), while the IPS electrode pair 133a and 133b is applied with a negative voltage (polarity), the white particles 145 move horizontally towards the cell walls 143a and 143b, so that the light beam 190 passes through the top electrode 150, the electrophoretic micro-cup structure 143, and the bottom electrode 133, reaches the solar cell 120 and is absorbed therein so as to convert the photon energy of the light beam 190 into electrical energy. The converted electrical energy may be used to drive one or more electrodes of the bottom electrode member.

In order to increase the contrast ratio, the substrate 110 is formed with a dark-state (absorbed) layer so as to reduce the refection of light.

Referring to FIG. 2, a different operation state of the EDP device 100 is shown. In this operation, each IPS electrode pair 131a and 131b, 132a and 132b, or 133a and 133b is applied with a negative voltage (polarity), while the top electrode 150 and the bottom electrodes 133, 134 and 135 are applied with a positive voltage (polarity). Accordingly, the white particles 145 in each electrophoretic micro-cup structure 141, 142 or 143 move horizontally towards the corresponding cell walls. As a result, the light bean 190 passes through the top electrode 150, each electrophoretic micro-cup structure 141, 142 or 143, and the corresponding bottom electrode 131, 132 or 133, reaches the solar cell 120 and is absorbed therein so as to convert the photon energy of the light beam 190 into electrical energy.

FIG. 3 shows schematically a cross-sectional view of an EPD device 300 according to another embodiment of the present invention. Similar to the EPD device 100 shown in FIGS. 1 and 2, the EPD device 300 has a substrate 310, a solar cell 320 formed the substrate 310, an interface layer 339 formed on the solar cell 320, a bottom electrode member 330 formed on the interface layer 339, an electrophoretic display panel 340 formed on the bottom electrode member 330, and a top electrode member 350 formed on the electrophoretic display panel 340.

The electrophoretic display panel 340 has a plurality of electrophoretic cell structures spatially arranged in a matrix form. Each electrophoretic cell structure 341, 342 or 343 is formed in an electrophoretic micro-cup structure defined by cell walls 341a and 341b, 342a and 342b, or 343a and 343b, and defines a middle area 347 and a side area 348 surrounding the middle area 346. Each electrophoretic micro-cup structure 341, 342 or 343 contains an electrophoretic medium 346 and a plurality of charged particles 345 dispersed in the electrophoretic medium 346 and being movable in the electrophoretic micro-cup structure 341, 342 or 343 responsively to applied fields. The electrophoretic medium 346 can be a colored electrophoretic medium such as a colored dielectric solvent, or a colorless electrophoretic medium. The plurality of charged particles 345 can be single-color charged particles with a single polarity or multi-color charged particles with one or more polarities.

The bottom electrode member 330 includes a plurality of bottom electrodes 331, 332 and 333 and in-plane switching (IPS) electrodes 331$a$ and 331$b$, 332$a$ and 332$b$, and 333$a$ and 333$b$. Each pair of the IPS electrodes, for example, the IPS electrode pair 331$a$ and 331$b$, is positioned in relation to the side area 348 of a corresponding electrophoretic micro-cup structure 341 and each bottom electrode, for example, the bottom electrode 331, is formed between the IPS electrode pair 331$a$ and 331$b$ and in relation to the middle area 347 of the corresponding electrophoretic micro-cup structure 341. The bottom electrode member 330 in this embodiment is formed in a passive type. The top electrode member 350 includes a single electrode 350.

Accordingly, the movements of the plurality of charged particles 345 in each electrophoretic cell structure 341, 342 or 343 can be individually controlled by applying biasing voltages among the top electrode 350, the bottom electrodes 331, 332 and 333, and the IPS electrodes 331$a$ and 331$b$, 332$a$ and 332$b$, and 333$a$ and 333$b$. In this example, it is assumed that the particles 345 is white and carry positive charges.

If the top electrode 350 is applied with a negative voltage (polarity), while the bottom electrode 331 is applied with a positive voltage (polarity), the white particles 345 migrate vertically to the top surface of the electrophoretic micro-cup structure 341. Accordingly, a viewer 399 sees the color of the pixel associated with the micro-cup structure 341 in the white color because the light beam 390 is scattered back to the viewer 399 by the particles 345.

If the top electrode 350 is applied with a positive voltage (polarity), while the bottom electrode 332 is applied with a negative voltage (polarity), the white particles 345 migrate vertically to the bottom surface of the electrophoretic micro-cup structure 342. Accordingly, a viewer 399 sees the color of the pixel associated with the micro-cup structure 341 in the color of the electrophoretic medium 346 (colored or transparent).

If both the top electrode 350 and the bottom electrode 333 are applied with a positive voltage (polarity), while the IPS electrode pair 333$a$ and 333$b$ is applied with a negative voltage (polarity), the white particles 345 move horizontally towards the cell walls 343$a$ and 343$b$, so that the light beam 390 passes through the top electrode 350, the electrophoretic micro-cup structure 343, and the bottom electrode 333, reaches the solar cell 320 and is absorbed therein so as to convert the photon energy of the light beam 390 into electrical energy.

Figure 4:
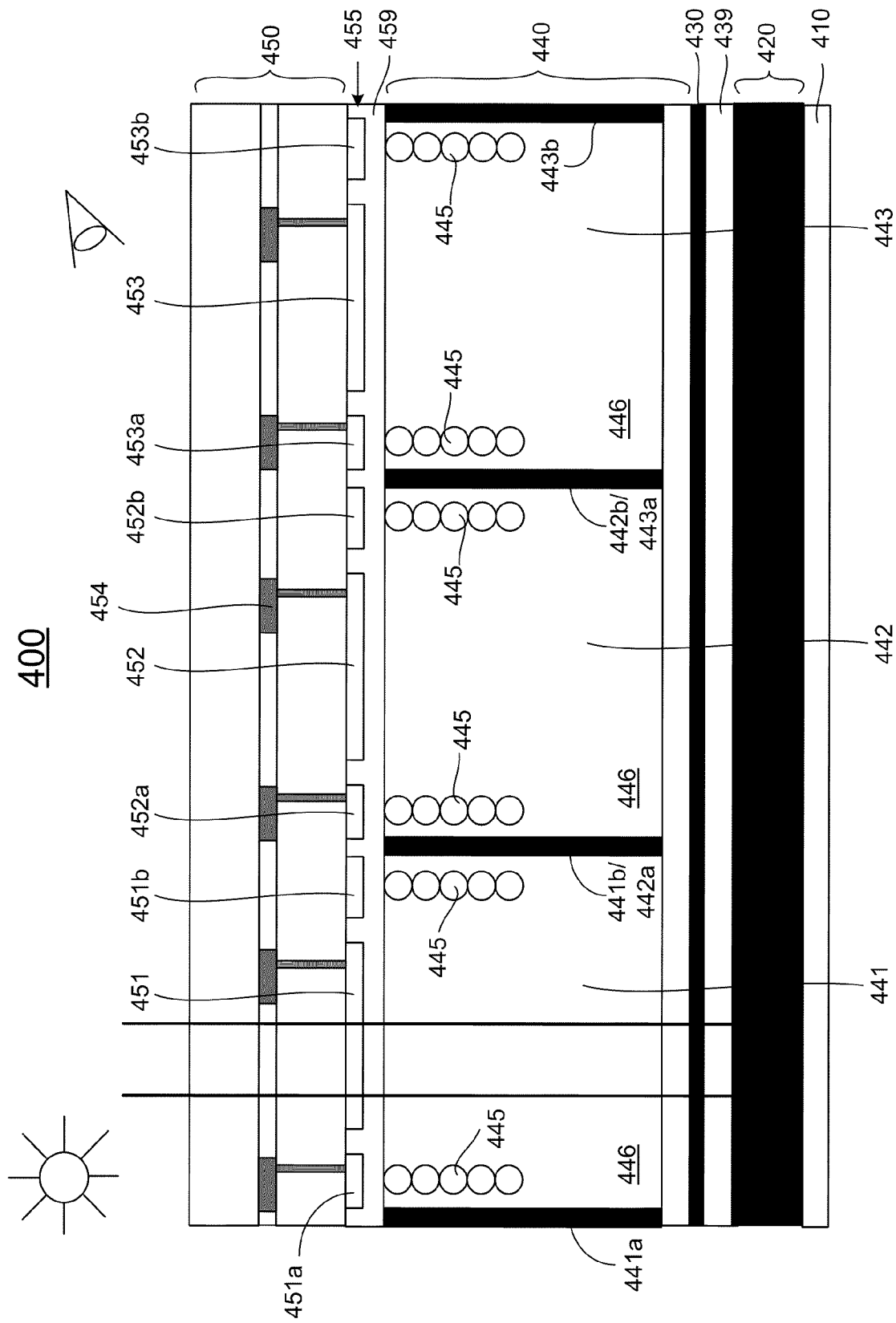
FIG. 4 shows schematically a cross-sectional view of an EPD device according to yet another embodiment of the present invention.

Referring now to FIG. 4, a cross-sectional view of an EPD device 400 is shown according to yet another embodiment of the present invention. Similar to the EPD device 300 shown in FIG. 3, the EPD device 400 has a substrate 410, a solar cell 420 formed the substrate 410, an interface layer 439 formed on the solar cell 420, a bottom electrode member 430 formed on the interface layer 439, an electrophoretic display panel 440 formed on the bottom electrode member 430, and a top electrode member 450 formed on the electrophoretic display panel 440.

The electrophoretic display panel 440 has a plurality of electrophoretic cell structures spatially arranged in a matrix form. Each electrophoretic cell structure 441, 442, or 443 is formed in an electrophoretic micro-cup structure defined by cell walls 441$a$ and 441$b$, 442$a$ and 442$b$, or 443$a$ and 443$b$, and defines a middle area and a side area surrounding the middle area. Each electrophoretic micro-cup structure 441, 442, or 443 contains an electrophoretic medium 446 and a plurality of charged particles 445 dispersed in the electrophoretic medium 446 and being movable in the electrophoretic micro-cup structure 441, 442 or 443 responsively to applied fields.

The bottom electrode member 430 includes a single electrode 430. The top electrode member 450 includes an active matrix electrode panel having a plurality of top electrodes 431, 452 and 453 and in-plane switching (IPS) electrodes 451$a$ and 451$b$, 452$a$ and 452$b$, and 453$a$ and 453$b$. Each pair of the IPS electrodes, for example, the IPS electrode pair 451$a$ and 451$b$, is positioned in relation to the side area of a corresponding electrophoretic micro-cup structure 441 and each top electrode, for example, the top electrode 451, is formed between the IPS electrode pair 451$a$ and 451$b$ and in relation to the middle area of the corresponding electrophoretic micro-cup structure 441. The top electrode member 450 also includes a plurality of switching devices such as TFTs 454, where each TFT 454 is electrically coupled to a bottom electrode or an IPS electrode pair.

Accordingly, the movements of the plurality of charged particles 445 in each electrophoretic cell structure 441, 442, or 443 can be individually controlled by applying biasing voltages among the top electrodes 451, 452 and 453, the IPS electrodes 451$a$ and 451$b$, 452$a$ and 452$b$, and 453$a$ and 453$b$ and the bottom electrode 430. In this example, each IPS electrode pair 451$a$ and 451$b$, 452$a$ and 452$b$, or 453$a$ and 453$b$ is applied with a negative voltage (polarity), while the bottom electrode 435 and the top electrodes 453, 454 and 455 are applied with a positive voltage (polarity). Accordingly, the white particles 445 in each electrophoretic micro-cup structure 441, 442 or 443 move horizontally towards the corresponding cell walls. As a result, the light bean 490 passes through the corresponding bottom electrode 451, 452 or 453, each electrophoretic micro-cup structure 441, 442 or 443, and the bottom electrode 430, reaches the solar cell 420 and is absorbed therein so as to convert the photon energy of the light beam 490 into electrical energy.

Figure 5:
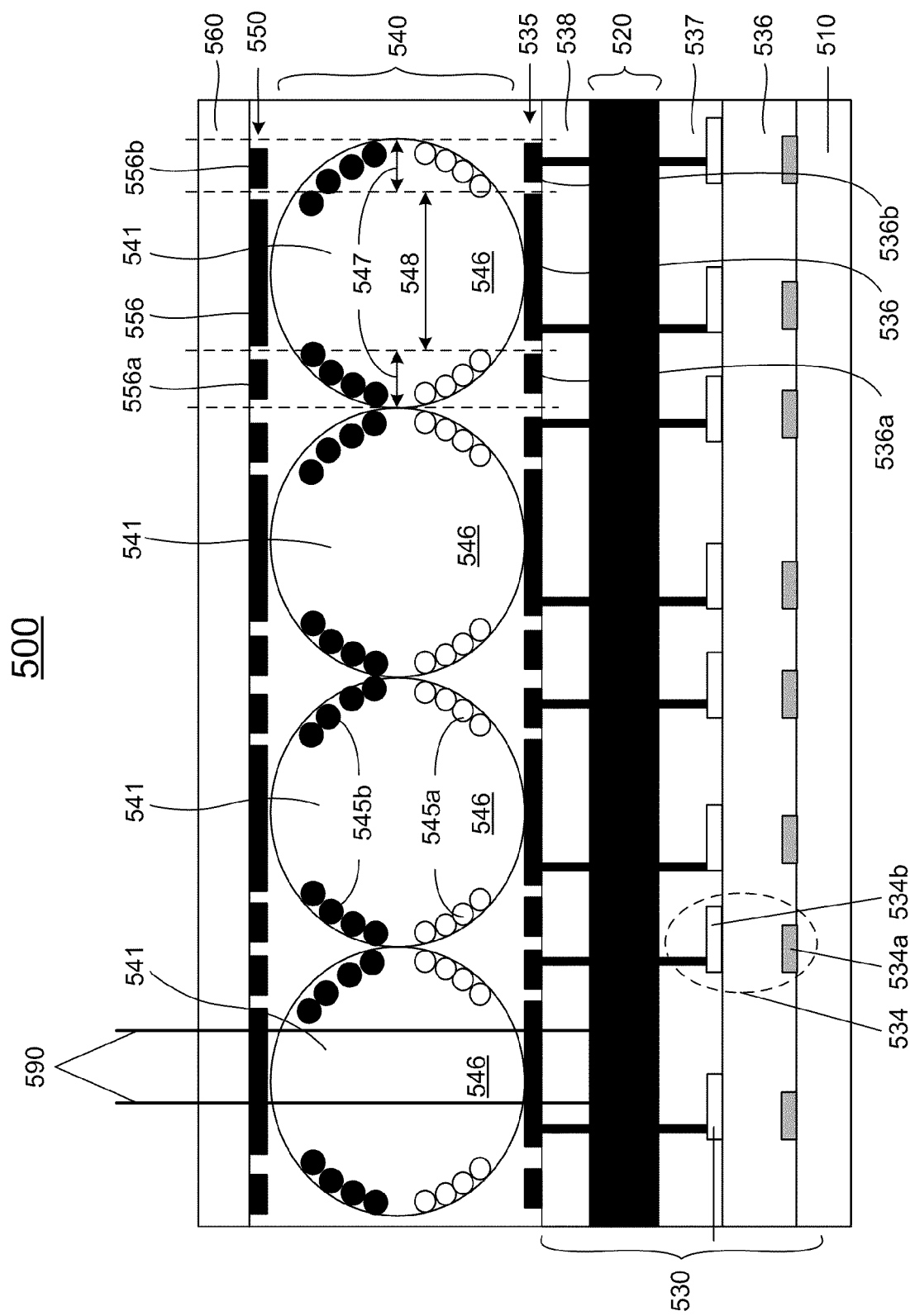
FIG. 5 shows schematically a cross-sectional view of an EPD device according to an alternative embodiment of the present invention.

Referring to FIG. 5, a cross-sectional view of an EPD device 500 is shown according to an alternative embodiment of the present invention. The EPD device 500 has a substrate 510, a bottom electrode member 530 formed on the substrate 510, a solar cell 520 embedded in a bottom electrode member 530, a top electrode member 550, and an electrophoretic display panel 540 formed between the bottom electrode member 530 and the top electrode member 550.

The electrophoretic display panel 540 includes a plurality of electrophoretic micro-capsule structures 541 spatially arranged in a matrix form. Each micro-capsule structure 541 defines a middle area 548 and a side area 547 surrounding the middle area 548 and contains an electrophoretic medium 546 and a plurality of charged particles 545$a$ and 545$b$ dispersed in the electrophoretic medium 546 and being movable in the electrophoretic micro-capsule structures 541 responsively to applied fields. In this embodiment, the plurality of charged particles 545$a$ and 545$b$ includes two-color charged particles with two opposite polarities, i.e., white particles 545$a$ charged with a positive polarity and black particles 545$b$ charged with a negative polarity.

The bottom electrode member 530 is formed in an active matrix type, while the top electrode member 550 is formed in a passive type.

As shown in FIG. 5, the bottom electrode member 530 includes a plurality of bottom electrodes 536 and IPS electrodes 536a and 536b and a switching member having a plurality of TFTs 534, where each TFT 534 is electrically coupled to a bottom electrode 536 or a pair of IPS electrodes 536a and 536b. In this embodiment, the gate electrode 534a and the source/drain electrodes 534b of each TFT 534 are respectively formed in different layers 536 and 537. The solar cell 520 is formed between the layer 537 and an interface layer 538. The plurality of bottom electrodes 536 and IPS electrodes 536a and 536b are formed on the interface layer 538. The bottom electrode member 530 is formed such that each pair of the IPS electrodes 536a and 536b is positioned in relation to the side area 547 of a corresponding electrophoretic micro-capsule structure 541 and each bottom electrode 536 is positioned between a corresponding pair of IPS electrodes 536a and 536b and in relation to the middle area 548 of the corresponding electrophoretic micro-capsule structure 541.

The top electrode member 550 includes a plurality of top electrodes 556 and IPS electrodes 556a and 556b, where each pair of the IPS electrodes 556a and 556b is positioned in relation to the side area 547 of a corresponding electrophoretic micro-capsule structure 541 and each top electrode 556 is positioned between a corresponding pair of IPS electrodes 556a and 556b and in relation to the middle area 548 of the corresponding electrophoretic micro-capsule structure 541.

According to the invention, the IPS electrodes 556a, 556b, 536a and 536b of the top and bottom electrode members 550 and 530 are adapted for selectively controlling movements of the charged particles 545a and 545b therein along a horizontal direction parallel to the electrophoretic display panel 540, while the top electrodes 556 and the bottom electrodes 536 are adapted for controlling movements of the charged particles 545a and 545b therein along a vertical direction perpendicular to the electrophoretic display panel 540.

For example, as shown in FIG. 5, if the voltage level of the top electrode 556 is substantially higher than that of the bottom electrode 536, the black particles 545b move vertically towards the top electrode member 550 while the white particles 545a move vertically towards the bottom electrode member 530. Further, if the voltage level of the IPS electrode pair 556a and 556b is substantially higher than that of the top electrode 556 of the top electrode member 550, the black particles 545b move horizontally towards the side area 547 of the electrophoretic micro-capsule structure 541. Additionally, if the voltage level of the IPS electrode pair 536a and 536b is lower than that of the bottom electrode 536 of the bottom electrode member 530, the white particles 545a move horizontally towards the side area 547 of the electrophoretic micro-capsule structure 541. Accordingly, the light bean 590 passes through each top electrode 556, each corresponding electrophoretic micro-capsule structure 541, and each corresponding bottom electrode 536, reaches the solar cell 520 and is absorbed therein so as to convert the photon energy of the light beam 590 into electrical energy.

FIGS. 6-8 show schematically an electrode layout of one pixel of an EPD device according to difference embodiments of the present invention, respectively. Specifically, it is corresponding to a pixel electrode layout of the bottom/top electrode member as shown in FIGS. 1-5. In these exemplary embodiments, each IPS electrode is formed to have a comb-like structure having two or more branches, for example, two braches B1 and B2, shown in FIGS. 6 and 7, and three branches B1, B2 and B3, shown in FIG. 8. Each bottom/top electrode is formed to have a comb-like structure having at least one branches, for example, one branch b1, shown in FIG. 6, and two branches b1 and b2, shown in FIGS. 7 and 8. The one or more branch of each bottom/top electrode and the two or more branches of its corresponding IPS electrode are alternately positioned so that each bottom/top electrode and its corresponding IPS electrode are complementary to each other. Further, each bottom/top electrode and its corresponding IPS electrode are controlled by a switch device such as thin film transistor T2 or T1, respectively, which, in turn, is coupled with a corresponding gate line and a corresponding signal line. Therefore, the voltage levels of each bottom/top electrode and its corresponding IPS electrode are determined by signals applied to the corresponding gate and signal lines.

In brief, the present invention, among other things, recites a shutter mode solar EPD device that utilizes a plurality of IPS electrode to selectively control horizontal movements of charged particles contained in its electrophoretic cell structures so as to improve the efficiency of the solar cell therein.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrophoretic display (EPD) device, comprising:
   (a) a substrate having a top surface and an opposite, bottom surface;
   (b) a solar cell formed on the top surface of the substrate;
   (c) an electrophoretic display panel having a plurality of electrophoretic cell structures spatially arranged in a matrix form, wherein each electrophoretic cell structure defines a middle area and a side area surrounding the middle area, and contains a plurality of charged particles movable in the electrophoretic cell structure responsively to applied fields;
   (d) a top electrode member formed on the electrophoretic display panel; and
   (e) a bottom electrode member formed between the solar cell and the electrophoretic display panel, having a plurality of bottom electrodes and in-plane switching (IPS) electrodes, wherein each IPS electrode is positioned in relation to a corresponding electrophoretic cell structure for controlling movements of the charged particles therein along a horizontal direction parallel to the electrophoretic display panel, and wherein each bottom electrode is positioned in relation to the IPS electrode and the corresponding electrophoretic cell structure for controlling movements of the charged particles therein along a vertical direction perpendicular to the electrophoretic display panel.

2. The EPD device of claim 1, wherein the plurality of charged particles comprises single-color charged particles with a single polarity or multi-color charged particles with one or more polarities.

3. The EPD device of claim 1, wherein each electrophoretic cell structure further contains an electrophoretic medium.

4. The EPD device of claim 3, wherein the electrophoretic medium comprises a colored electrophoretic medium or a colorless electrophoretic medium.

5. The EPD device of claim 1, wherein each electrophoretic cell structure is formed of an electrophoretic micro-cup structure or an electrophoretic micro-capsule structure.

6. The EPD device of claim 1, wherein the top electrode member comprises a single electrode.

7. The EPD device of claim 1, wherein the top electrode member comprises a plurality of top electrodes and IPS electrodes, each top electrode and each IPS electrode positioned in relation to a corresponding bottom electrode and a corresponding IPS electrode, respectively, of the bottom electrode member.

8. The EPD device of claim 1, wherein the top electrode member and the bottom electrode member are transparent to light.

9. The EPD device of claim 1, wherein each IPS electrode has two or more branches, and each bottom electrode has at least one branch, and wherein the at least one branch of each bottom electrode and the two or more branches of its corresponding IPS electrode are alternately positioned so that each bottom electrode and its corresponding IPS electrode are complementary to each other.

10. The EPD device of claim 9, wherein the bottom electrode member comprises an active matrix electrode member comprising a plurality of thin-film transistors (TFTs), each TFT electrically coupled to one of the plurality of bottom electrodes and IPS electrodes.

11. The EPD device of claim 9, wherein the bottom electrode member comprises a passive matrix electrode member.

12. The EPD device of claim 11, wherein the interface layer comprises an insulative layer or an adhesive layer.

13. The EPD device of claim 1, further comprising an interface layer formed between the electrophoretic display panel and the plurality of bottom electrodes and IPS electrodes of the bottom electrode member.

14. The EPD device of claim 1, further comprising at least one of a touch function film, a color filter and a barrier film layer formed on the top electrodes.

15. The EPD device of claim 1, wherein the solar cell comprises a top electrode, a bottom electrode formed on the substrate and an photovoltaic converting layer formed between the top electrode and the bottom electrode, wherein the top electrode is transparent.

16. An electrophoretic display (EPD) device, comprising:
(a) a substrate having a top surface and an opposite, bottom surface;
(b) a solar cell formed on the top surface of the substrate;
(c) a bottom electrode member formed on the solar cell;
(d) an electrophoretic display panel formed on the bottom electrode member, having a plurality of electrophoretic cell structures spatially arranged in a matrix form, wherein each electrophoretic cell structure defines a middle area and a side area surrounding the middle area, and contains a plurality of charged particles movable in the electrophoretic cell structure responsively to applied fields; and
(e) a top electrode member formed on the electrophoretic display panel, having a plurality of top electrodes and in-plane switching (IPS) electrodes, wherein each IPS electrode is positioned in relation to a corresponding electrophoretic cell structure for controlling movements of the charged particles therein along a horizontal direction parallel to the electrophoretic display panel, and wherein each bottom electrode is positioned in relation to the IPS electrode and the middle area of the corresponding electrophoretic cell structure for controlling movements of the charged particles therein along a vertical direction perpendicular to the electrophoretic display panel.

17. The EPD device of claim 16, wherein the plurality of charged particles comprises single-color charged particles with a single polarity or multi-color charged particles with one or more polarities.

18. The EPD device of claim 16, wherein each electrophoretic cell structure further contains an electrophoretic medium.

19. The EPD device of claim 18, wherein the electrophoretic medium comprises a colored electrophoretic medium or a colorless electrophoretic medium.

20. The EPD device of claim 16, wherein each electrophoretic cell structure is formed of an electrophoretic micro-cup structure or an electrophoretic micro-capsule structure.

21. The EPD device of claim 16, wherein the top electrode member and the bottom electrode member are transparent to light.

22. The EPD device of claim 16, wherein each IPS electrode has two or more branches, and each bottom electrode has at least one branch, and wherein the at least one branch of each bottom electrode and the two or more branches of its corresponding IPS electrode are alternately positioned so that each bottom electrode and its corresponding IPS electrode are complementary to each other.

23. The EPD device of claim 22, wherein the top electrode member comprises an active matrix electrode member comprising a plurality of thin-film transistors (TFTs), each TFT electrically coupled to one of the plurality of bottom electrodes and IPS electrodes.

24. The EPD device of claim 22, wherein the top electrode member comprises a passive matrix electrode member.

25. An electrophoretic display (EPD) device, comprising:
(a) a solar cell formed on a substrate;
(b) a bottom electrode member formed on the solar cell;
(c) an electrophoretic display panel formed on the bottom electrode member, having a plurality of electrophoretic cell structures spatially arranged in a matrix form, wherein each electrophoretic cell structure defines a middle area and a side area surrounding the middle area, and contains a plurality of charged particles movable in the electrophoretic cell structure responsively to applied fields; and
(d) a top electrode member formed on the electrophoretic display panel, wherein at least one of the bottom electrode member and the top electrode member comprises a plurality of in-plane switching (IPS) electrodes, wherein each IPS electrode is positioned in relation to a corresponding electrophoretic cell structure for controlling movements of the charged particles therein along a horizontal direction parallel to the electrophoretic display panel.

26. The EPD device of claim 25, wherein the at least one of the bottom electrode member and the top electrode member further comprises a plurality of electrodes, wherein each electrode is positioned in relation to the IPS electrode and the corresponding electrophoretic cell structure for controlling movements of the charged particles therein along a vertical direction perpendicular to the electrophoretic display panel.

27. The EPD device of claim 26, wherein each IPS electrode has two or more branches, and each bottom electrode has at least one branch, and wherein the at least one branch of each bottom electrode and the two or more branches of its corresponding IPS electrode are alternately positioned so that each bottom electrode and its corresponding IPS electrode are complementary to each other.

28. The EPD device of claim 27, wherein the at least one of the bottom electrode member and the top electrode member comprises an active matrix electrode member comprising a plurality of thin-film transistors (TFTs), each TFT electrically coupled to one of the plurality of bottom electrodes and IPS electrodes.

29. The EPD device of claim 27, wherein the at least one of the bottom electrode member and the top electrode member comprises a passive matrix electrode member.

30. The EPD device of claim 25, wherein the plurality of charged particles comprises single-color charged particles with a single polarity or multi-color charged particles with one or more polarities.

31. The EPD device of claim 25, wherein each electrophoretic cell structure further contains an electrophoretic medium.

32. The EPD device of claim 31, wherein the electrophoretic medium comprises a colored electrophoretic medium or a colorless electrophoretic medium.

33. The EPD device of claim 25, wherein each electrophoretic cell structure is formed of an electrophoretic micro-cup structure or an electrophoretic micro-capsule structure.

34. The EPD device of claim 25, wherein the top electrode member and the bottom electrode member are transparent to light.

35. The EPD device of claim 25, wherein the solar cell comprises a top electrode, a bottom electrode formed on the substrate and an photovoltaic converting layer formed between the top electrode and the bottom electrode, wherein the top electrode is transparent.

36. An electrophoretic display (EPD) device, comprising:
(a) a bottom electrode member comprising a bottom electrode layer having a plurality of bottom electrodes and in-plane switching (IPS) electrodes and a switching member having a plurality of thin-film transistors (TFTs), wherein each TFT is electrically coupled to one of the plurality of bottom electrodes and IPS electrodes; and
(b) a solar cell formed between the bottom electrode layer and the switching member of the bottom electrode member;
(c) an electrophoretic display panel formed on the bottom electrode layer of the bottom electrode member, having a plurality of electrophoretic cell structures spatially arranged in a matrix form, wherein each electrophoretic cell structure defines a middle area and a side area surrounding the middle area, and contains a plurality of charged particles movable in the electrophoretic cell structure responsively to applied fields; and
(d) a top electrode member formed on the electrophoretic display panel, wherein the bottom electrode member is formed such that each IPS electrode is positioned in relation to a corresponding electrophoretic cell structure for controlling movements of the charged particles therein along a horizontal direction parallel to the electrophoretic display panel, while each bottom electrode is positioned in relation to the IPS electrode and the corresponding electrophoretic cell structure for controlling movements of the charged particles therein along a vertical direction perpendicular to the electrophoretic display panel.

37. The EPD device of claim 36, wherein each IPS electrode has two or more branches, and each bottom electrode has at least one branch, and wherein the at least one branch of each bottom electrode and the two or more branches of its corresponding IPS electrode are alternately positioned so that each bottom electrode and its corresponding IPS electrode are complementary to each other.

38. The EPD device of claim 36, wherein the plurality of charged particles comprises single-color charged particles with a single polarity or multi-color charged particles with one or more polarities.

39. The EPD device of claim 38, wherein each electrophoretic cell structure further contains an electrophoretic medium.

40. The EPD device of claim 39, wherein the electrophoretic medium comprises a colored electrophoretic medium or a colorless electrophoretic medium.

41. The EPD device of claim 36, wherein each electrophoretic cell structure is formed of an electrophoretic micro-cup structure or an electrophoretic micro-capsule structure.

42. The EPD device of claim 36, wherein the top electrode member comprises a single electrode.

43. The EPD device of claim 36, wherein the top electrode member comprises a plurality of top electrodes and IPS electrodes, each top electrode and each IPS electrode positioned in relation to a corresponding bottom electrode and a corresponding IPS electrode, respectively, of the bottom electrode member.

44. The EPD device of claim 36, wherein the top electrode member and the bottom electrode member are transparent to light.

* * * * *